United States Patent [19]

Bush et al.

[11] 3,993,549

[45] Nov. 23, 1976

[54] CURABLE SOLID ADDUCTS OF POLYENE-POLYTHIOL COMPOSITIONS WITH UREA

[75] Inventors: Richard W. Bush, Columbia; Louis L. Wood, Rockville, both of Md.

[73] Assignee: W. R. Grace & Co., New York, N.Y.

[22] Filed: July 12, 1974

[21] Appl. No.: 487,938

[52] U.S. Cl. .............................. 204/159.22; 96/35.1; 204/159.15; 204/159.18; 204/159.24; 204/159.23; 260/42.47; 260/42.53; 260/77.5 CR; 260/77.5 BB; 260/79; 260/79.5 C; 427/54; 428/419; 428/325; 428/425; 428/461
[51] Int. Cl.$^2$........................ C08F 2/46; C08F 8/18
[58] Field of Search................. 204/159.15, 159.19, 204/159.23, 159.18, 159.14, 159.22; 260/77.5, 79.5; 428/325, 419, 425, 461

[56] References Cited
UNITED STATES PATENTS

| | | | |
|---|---|---|---|
| 3,661,744 | 5/1972 | Kehr et al. | 204/159.14 |
| 3,697,397 | 10/1972 | Kehr et al. | 204/159.14 |
| 3,697,402 | 10/1972 | Kehr et al. | 204/159.14 |

*Primary Examiner*—Richard B. Turer
*Attorney, Agent, or Firm*—Richard P. Plunkett; Kenneth E. Prince

[57] ABSTRACT

This invention relates to a solid curable composition formed by adding finely divided urea in amounts ranging from 10 to 70 weight percent of the composition to liquid polyene/polythiol curable systems wherein the combined polyene and polythiol contain at least 20 percent by weight of oxyethylene units. The thus formed solid compositions are readily cured by radiation, e.g., high energy ionizing radiation or U. V. radiation in the presence of a photocuring rate accelerator.

9 Claims, No Drawings

CURABLE SOLID ADDUCTS OF POLYENE-POLYTHIOL COMPOSITIONS WITH UREA

This invention relates to solid curable compositions. More particularly, this invention relates to the addition of urea to liquid polyene/polythiol mixtures containing substantial proportions of oxyethylene units, which addition results in a thermoplastic solid prepolymer which can be subsequently cured in the solid state.

Liquid polyene/polythiol systems curable by radiation are known in the art. See U.S. Pat. No. 3,661,744 and 3,708,413. These liquid systems can be used to make imaged substrates such as printing plates and photoresists wherein the areas exposed to radiation imagewise, e.g., through an image bearing transparency, are cured to a solid and the unexposed liquid portion is removed. See U.S. Pat. No. 3,615,450.

One drawback these liquid polyene/polythiol systems have in imaging applications is that it is necessary to maintain an air gap between the image bearing transparency and the liquid polyene/polythiol to insure that the transparency does not stick to the composition on curing, thereby rendering their subsequent separation difficult or impossible and furthermore damaging the transparency, preventing its future use. Additionally, due to the air gap, the resolution of the imaged area is not as good as when the image bearing transparency is in direct contact with the curable composition.

One object of the instant invention is to produce a solid polyene/polythiol composition which can be used for imaging purposes without the aforestated drawback. Another object of the instant invention is to produce a polyene/polythiol composition which at slightly elevated temperatures can be readily applied as a spreadable liquid or paste which upon cooling and standing becomes solid. Yet another object of the instant invention is to produce solid polyene/polythiol compositions containing a photocuring rate accelerator which can be crosslinked by ultraviolet radiation without melting. Other objects will become apparent from a reading hereinafter.

The solid curable composition of the instant invention is formed by adding finely divided urea in amounts ranging from 10 to 70 weight percent of the composition to a curable liquid mixture comprising (1) a polyene containing at least 2 unsaturated carbon to carbon bonds per molecule and (2) a polythiol containing at least 2 thiol groups per molecule, the total combined functionality of the unsaturated carbon to carbon bonds per molecule in the polyene and the thiol groups per molecule in the polythiol being greater than 4, and the combined polyene and polythiol containing at least 20 percent by weight of oxyethylene units.

In the instance where the composition is cured by U. V. radiation, 0.0005 to 40 parts by weight of the polyene and polythiol of a photocuring rate accelerator is added to the composition.

The polyenes and polythiols which are operable herein must contain at least 20% by weight of oxyethylene units on a combined basis. Thus it is possible to obtain a solid mixture with urea when only the polyene or only the polythiol contains oxyethylene units in an amount sufficient to be at least 20% by weight of the combined polyene/polythiol.

It has been found that not merely any filler is operable to form a solid composition in accord with the instant invention. Other finely divided solid materials, such as barium sulfate or partially polymerized diallyl phthalate, when used in various amounts in combination with a polyene/polythiol composition containing at least 20% by weight of oxyethylene units resulted only in viscous liquids or pastes rather than hard solids. Furthermore, various fillers when used in combination with polyene/polythiol compositions which did not contain at least 20% by weight of oxyethylene units failed to form the solid mixtures obtained with urea and oxyethylene-containing polyene/polythiol mixtures.

It is believed that the urea forms a crystalline complex with the oxyethylene chains of the polyene and polythiol. X-ray crystallography of the polyene/polythiol/urea combinations of the instant invention confirm the formation of a new crystalline structure differing from urea per se.

The polyenes operable herein contain at least 2 unsaturated carbon to carbon bonds per molecule, have a molecular weight in the range of about 300–20,000 and a viscosity ranging from substantially 0–20 million centipoises at 70° C.

On the average the polythiols must contain 2 or more —SH groups/molecule. They usually have a viscosity range of 0 to 20 million centipoises (cps) at 70° C as measured by a Brookfield Viscometer. Included in the term "polythiols" as used herein are those materials which in the presence of an inert solvent, aqueous dispersion or plasticizer fall within the viscosity range set out above at 70° C. Operable polythiols in the instant invention usually have molecular weights in the range 50–20,000, preferably 100–10,000.

The term "functionality" as used herein refers to the average number of ene or thiol groups per molecule in the solid or liquid polyene or polythiol, respectively. For example, a tetraene is a polyene with an average of four "reactive" carbon to carbon unsaturated groups per molecule and thus has a functionality (f) of four. A dithiol is a polythiol with an average of two thiol groups per molecule and thus has a functionality (f) of two.

To obtain the maximum strength, solvent resistance, creep resistance, heat resistance and freedom from tackiness, the reactive components consisting of the urea, polyene and polythiol in combination with the curing rate accelerator of this invention are formulated to give crosslinked, three-dimensional network urea complexed polythioether polymer systems on curing. In order to achieve such infinite network formation, the individual polyenes and polythiol must each have a functionality of at least 2 and the sum of the functionalities of the polyene and polythiol components must always be greater than 4.

The solid photopolymer compositions to be cured, in accord with the present invention may, if desired, include such additives as stabilizers, antioxidants, accelerators, dyes, inhibitors, activators, fillers, pigments, anti-static agents, flame-retardant agents, surface-active agents, extending oils, plasticizers, and the like within the scope of this invention. Such additives are usually preblended with the polyene or polythiol prior to or during the compounding step. The aforesaid additives may be present in quantities up to 500 or more parts based on 100 parts by weight of the polyene/polythiol compositions and preferably 0.005–300 parts on the same basis.

To insure that the composition does not precure prior to use, a stabilizer or stabilizers are usually added to the polyene prior to admixture with the polythiol.

Operable stabilizers include various well known commercially available materials such as octadecyl β (4-hydroxy-3,5-di-t-butylphenyl) propionate commercially available from Geigy Chemical Co., under the tradename "Irganox 1076;" 2,6-ditertiary-butyl-4-methylphenol commercially available under the tradename "Ionol" from Shell Chemical Co., pyrogallol, phosphorous acid, hydroquinone and the like. The stabilizers are usually added in amounts ranging from 0.01 to 5.0 parts per 100 parts by weight of the polyene/polythiol composition.

When UV radiation is used for curing a photocuring rate accelerator is added to the composition. Various photocuring rate accelerators are operable and well known to those skilled in the art. Examples of photocuring rate accelerators include, but are not limited to, benzophenone, acetophenone, acenapthene-quinone, methyl ethyl ketone, valerophenone, hexanophenone, γ-phenylbutyrophenone, p-morpholinopropiophenone, dibenzosuberone, 4-morpholinobenzophenone, 4'-morpholinodeoxybenzoin, p-diacetylbenzene, 4-aminobenzophenone, 4'-methoxyacetophenone, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz-[de]anthracen-7-one, 1-naphthaldehyde, 4,4'-bis(dimethylamino) benzophenone, fluorene-9-one, 1'-acetonaphthone, 2'-acetonaphthone and 2,3-butanedione, etc. which serve to give greatly reduced exposure times and thereby when used in conjunction with various forms of energetic radiation yield very rapid, commercially practical time cycles by the practice of the instant invention. The photocuring rate accelerators or photoinitiators are usually added in an amount ranging from 0.0005 to 50% by weight.

When U. V. radiation is used for the curing reaction, an intensity of 0.0004 to 60.0 watts/cm.$^2$ in the 300–400 nanometer region is usually employed.

The compositions herein can also be cured by high energy ionizing irradiation without the presence of a photocuring rate accelerator. Ionizing irradiation in the instant invention includes treatment with high energy particle irradiation or by gamma-rays or X-rays. Irradiation employing particles in the instant invention includes the use of positive ions, (e.g., protons, alpha particles and deuterons), electrons or neutrons. The charged particles may be accelerated to high speeds by means of various voltage gradient mechanisms such as a Van de Graaff generator, a cyclotron, a Cockroft Walton accelerator, a resonant cavity accelerator, a betatron, a G.E. resonant transformer, a synchrotron or the like. Furthermore, particle irradiation may also be supplied from radioactive isotopes or an atomic pile. Gamma rays or X-rays may be obtained from radioisotopes (e.g. cobalt 60) or by particle bombardment of suitable target material (e.g., high energy electrons on a gold metal target).

The amount of ionizing radiation which is employed in curing the radiation curable material in the instant invention can vary between broad limits. Radiation dosages of less than a megarad up to 10 megarads or more for electrons are operable, preferably 0.02 to 5 megarads energy absorbed are employed. For gamma-rays or X-rays, radiation dosages in the range 0.0001 to 5.0 megarads energy absorbed are operable. The irradiation step is ordinarily performed under ambient temperature conditions but can be performed at temperatures ranging from below room temperature up to temperatures of 90° C.

The dose rate for the irradiation operable to cure the composition in the instant invention is in the range 0.0001 to 1000 megarads/second.

When using ionizing radiation, the depth of penetration is dependent upon the density of the material to be penetrated. When the ionizing irradiation is in the form of electrons, 0.1 to 12 million electron volts (mev.) are usually employed. Where gamma-rays or X-rays are employed, a range of 0.01 to 5.0 million electron volts is used.

The following examples will aid in explaining but expressly not limit the invention. Unless otherwise noted all parts and percentages are by weight.

EXAMPLE I

To a 1 liter, three-necked, round bottom flask equipped with nitrogen flow, stirrer, heating mantle and thermometer was added 348 grams of toluene diisocyanate. The flask was heated to 55° C and 449 grams of trimethylolpropane diallyl ether was added slowly from a dropping funnel with stirring while maintaining the temperature at 60°–65° C. The reaction was continued for 2 hours, after which the heat was removed and the material stored under nitrogen. The resulting product contained 2.31 meq. NCO/g., weighed 797 grams and had the formula:

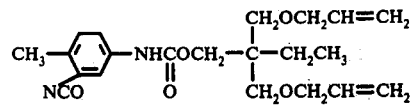

EXAMPLE II

To a 1 liter resin kettle equipped with stirrer, nitrogen flow, heating mantle and thermometer was added 283 grams of commercially available polyethylene glycol having a molecular weight of 1000. The polyethylene glycol was heated until melted and then vacuum stripped at 70°–75° C for 1 hour at approximately 1mm Hg. vacuum. The vacuum was broken and the nitrogen flow continued while the material cooled to 55° C. 0.25 grams of stannous octoate was charged to the resin kettle. 217 grams of the resultant product from Example I supra was added to the polyethylene glycol slowly by means of a dropping funnel with stirring. After 1 hour IR analysis for free isocyanate showed that the reaction was complete. The resultant oxyethylene-containing polyene product weighed 500 grams, had the average formula:

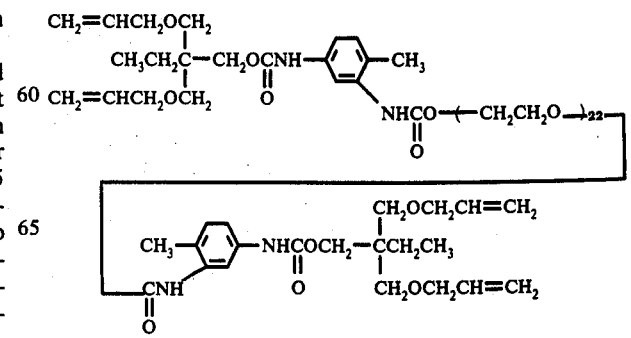

and will be referred to hereinafter as Polyene A.

EXAMPLE III

Commercially available polyethylene glycol having a molecular weight of 200 was vacuum stripped at 70°C for 1 hour at approximately 1mm. Hg. vacuum. 69.1 grams of the stripped polyethylene glycol was charged along with 0.185 grams of stannous octoate to a 500 ml. round bottom flask equipped with stirrer, thermometer, heating mantle and nitrogen flow. The flask was heated to 55°C and 304 grams of the reaction product from Example I was added to the flask slowly by means of a dropping funnel with stirring while maintaining the temperature at 60°–65° with a water bath. The reaction was continued overnight until the infrared analysis showed less than 0.004 meq. NCO/g. The resultant oxyethylene-containing polyene product weighed 373 grams, had a viscosity of 174,000 cps. at 50° C as measured on a Brookfield Viscometer, and had the average formula:

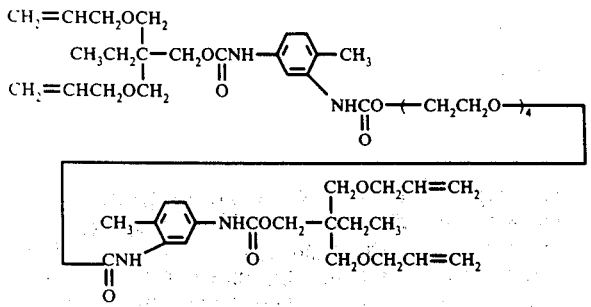

and will be referred to hereinafter as Polyene B.

EXAMPLE IV

To a 1 liter round bottom flask equipped with stirrer, thermometer, heating mantle and nitrogen flow was added 214 grams of commercially available polyethylene glycol having a molecular weight of 600 wherein it was vacuum stripped at 70°–75° C for 1 hour at approximately 1 mm. Hg. vacuum. The stripped polyethylene glycol was cooled to 65° C and 0.25 grams of stannous octoate was added to the flask. 286 grams of the reaction product from Example I was added to the flask slowly by means of a dropping funnel with stirring while maintaining the temperature at 60°–70° C with a water bath. The reaction was continued with stirring for 3 hours after which time the infrared analysis showed less than 0.01 meq. NCO/g. The resultant oxyethylene-containing polyene product weighed 500 grams, had a viscosity of 47,000 cps. at 30° C as measured on a Brookfield viscometer, and had the average formula:

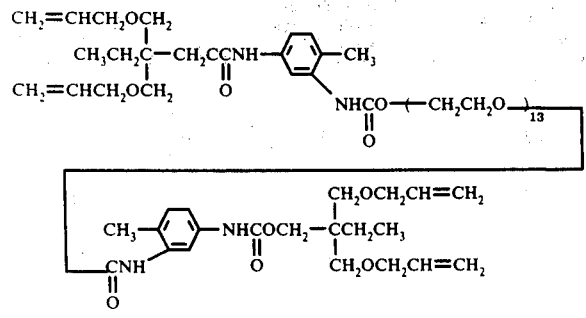

and will be referred to hereinafter as Polyene C.

EXAMPLE V

To a 1 liter round bottom flask equipped with stirrer, thermometer, heating mantle and nitrogen flow was added 160 grams of commercially available polyethylene glycol having a molecular weight of 400 wherein it was vacuum stripped at 70°–75° C for 1 hour at approximately 1 mm. Hg. vacuum. The stripped polyethylene glycol was cooled to 55° C and 0.25 grams of stannous octoate was added to the flask. 340 grams of the reaction product from Example I was added to the flask slowly by means of a dropping funnel with stirring while maintaining the temperature at 60°–70° C with a water bath. The reaction was continued with stirring for 3 hours after which time the infrared analysis showed less than 0.01 meq. NCO/g. The resultant oxyethylene-containing polyene product weighed 500 grams, had a viscosity of 176,000 cps. at 30°C as measured on a Brookfield Viscometer, and had the average formula:

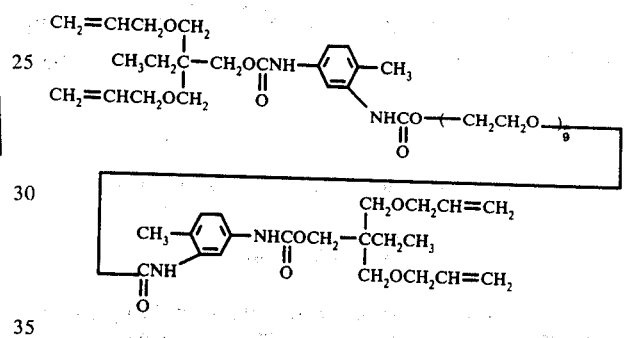

and will be referred to hereinafter as Polyene D.

EXAMPLE VI

To a 2 liter, three-necked, round bottom flask equipped with nitrogen flow, stirrer, heating mantle and thermometer was added 187 grams of toluene diisocyanate. 0.75 grams stannous octoate was added to the flask and 241 grams of trimethylolpropane diallyl ether was added slowly from a dropping funnel with stirring while maintaining the temperature at 60°–70° C. The reaction was continued for 2 hours. 1072 grams of commercially available polypropylene glycol having a molecular weight of 2025 which had been vacuum stripped at 100° C for 1 hour at approximately 2 mm. Hg. vacuum, was added to the flask by means of a dropping funnel with stirring. After 1.5 hours, IR analysis for isocyanate showed that the reaction was complete. The resultant oxypropylene-containing polyene product weighed 1500 grams, and had the average formula:

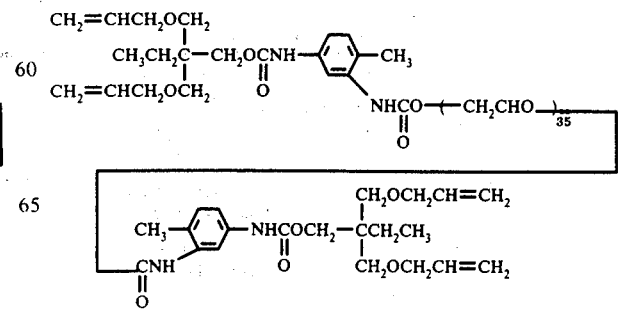

and will be referred to hereinafter as Polyene E.

EXAMPLE VII

A round bottom flask is fitted with a stirrer, thermometer, dropping funnel, nitrogen inlet and outlet. The flask can be placed in a heating mantle or immersed in a water bath as required.

Two moles (428 grams) of trimethylol-propane diallyl ether were mixed with 0.2 cc. of dibutyl tin dilaurate under nitrogen. One mole of tolylene-2,4-diisocyanate was added to the mixture, using the rate of addition and cooling water to keep the temperature under 70° C. After the addition was complete the heating mantle was used to keep the temperature at 70° C for another hour. Isocyanate analysis showed the reaction to be essentially complete at this time, resulting in the following polyene product:

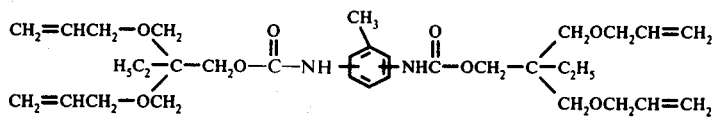

which will be referred to hereinafter as Polyene F.

EXAMPLE VIII

To a 4 ounce glass jar was charged 43.9 grams of Polyene A from Example II, 0.41 grams of benzophenone as a curing rate accelerator and as stabilizers 0.41 grams of 2,6-ditertiary-butyl-4-methylphenol, 0.41 grams of octadecyl β-(4-hydroxy-3,5-di-t-butyl-phenyl)propionate and 0.05 grams of phosphorous acid. 38.8 grams of commercially available polyethylene glycol di(3-mercaptopropionate) having a molecular weight of 776 was added to the glass jar and the mixture was stirred until homogeneous. At ambient temperature (24° C) this mixture was a liquid.

20 grams of the mixture was heated at about 50°–60° C, and 10 grams of urea which had been ground in a fluid energy mill with air until the particle size was below 10 microns was added to the mixture with vigorous mechanical stirring. A smooth paste resulted, which became a hard solid upon cooling at ambient temperature (24° C) overnight. This urea-containing polyene/polythiol composition melted at 88° C. The composition was melted and spread to about 20 mil thickness and cooled to solidify. The composition was exposed for 1 minute to irradiation from a Ferro Allied Ultraviolet Energy Source Module having a 1440-watt, 24 inch GE-H24T3 mercury lamp in a parabolic reflector at a lamp-to-photopolymer composition distance of 50 cm. The surface intensity on the photopolymer composition was about 8000 microwatts/cm.$^2$ in the 300–400 nonometer wavelength region. The gel content of the solid photopolymer composition prior to exposure upon extraction in refluxing methanol was 0% and after U.V. exposure was 25%, indicating the formation of a crosslinked polymeric structure.

EXAMPLE IX

The urea-containing polyene/polythiol composition was the same as in Example VIII. The composition was melted and the molten material was spread to a 20 mil thickness onto an aluminum substrate and cooled to a solid at ambient conditions to form a printing plate.

The material on the substrate in solid form was exposed imagewise through a line and halftone negative in direct contact with the plate to an "Ascorlux" pulsed xenon lamp for 3 minutes at a surface intensity on the photopolymer material of 2500 microwatts/cm$^2$ in the 300–400 nonometer region to cure the exposed portions of the photopolymer material. No melting of the photopolymer composition occured during exposure, and the negative was readily removed from the plate. The plate was developed in a water spray at 35° C to give rapid removal of the unexposed areas. On printing the thus formed relief printing plate gave good resolution.

Polyenes A and B from Examples II and III were separately admixed with various polythiols in stoichiometric amounts and combined with pulverized urea of particle size below 10 microns at slightly elevated temperatures to make (polyene/polythiol):urea compositions in the weight ratio 67:33, coated (20 mils thick) on a substrate and subsequently cooled to room temperature to solidify. The compositions also contained minor amounts of benzophenone and the stabilizers set out in Example VIII. Table I summarizes the properties of these various compositions before and after U.V. radiation exposure as in Example VIII.

TABLE I

| Example No. | Polyene/Polythiol | Weight % Oxyethylene Units in Polyene/Polythiol | M.p. of Polyene/Polythiol Urea Composition ° C | % Gel n MeOH$^{(a)}$ | |
| --- | --- | --- | --- | --- | --- |
| | | | | Unexposed | Exposed |
| X | Polyene A/polyethylene glycol di(3-mercaptopropionate) MW 776 | 66 | 88 | 0 | 25 |
| XI | Polyene A/polyethylene glycol di-(3-mercaptopropionate) MW 576 | 62 | 89 | 0 | 52 |
| XII | Polyene A/polyethylene glycol di-(3-mercaptopropionate) MW 326 | 53 | 78 | 2 | 60 |
| XIII | Polyene A/pentaerythritol tetrakis (β-mercaptopro- | 44 | 64 | 1 | 56 |

TABLE I-continued

| Example No. | Polyene/Polythiol | Weight % Oxyethylene Units in Polyene/ Polythiol | M.p. of Polyene/ Polythiol Urea Composition ° C | % Gel n MeOH[a] Unexposed | Exposed |
|---|---|---|---|---|---|
| XIV | pionate) Polyene B/polyethylene glycol di-(3-mercaptopropionate) MW 776 | 56 | 87–92 | 2 | 28 |

[a] Cured samples were measured for gel content by charging an exactly weighed sample to a fiber thimble and extracting the uncured portion from the thimble in refluxing methanol during a 16 hour period.

The gel results in Table I demonstrate that the solids as prepared are not already crosslinked but are photocurable to crosslinked products. 20 mil thick coatings of the compositions from Examples X–XIV were placed on an aluminum substrate, solidified and exposed imagewise to U. V. radiation as in Example IX. No melting was observed after the 3 minute exposure. After development by water spray at 35° C., legible images with good adhesion were obtained.

To establish the structural requirements of the photopolymer components and the urea concentration for formation of solid crystalline complexes, the following blends were made at 50°–60°C. and examined after cooling and standing overnight.

TABLE II

| Example No. | Photopolymer Component | Weight % Oxyethylene Units in Photopolymer Component | M.p. of Adduct at Various Urea Contents ° C | | |
|---|---|---|---|---|---|
| | | | 20% | 33% | 50% |
| | POLYENES | | | | |
| XV | Polyene A | 56 | 34–35 | 68–72 | 66–68 |
| XVI | Polyene B | 21 | liquid | liquid | 40–45 |
| | POLYTHIOLS | | | | |
| XVII | Polyethylene glycol di-(3-mercaptopropionate) MW 776 | 48 | 45–50 | 87–91 | 78–82 |
| XVIII | Polyethylene glycol di-(3-mercaptopropionate) MW 576 | 40 | liquid | liquid | 68–72 |
| XIX | Polyethylene glycol di-(3-mercaptopropionate) MW 326 | 28 | liquid | liquid | 60–65 |
| XX | Pentaerythritol tetrakis (β-mercaptopropionate) | 0 | liquid | liquid | liquid |
| | GLYCOLS | | | | |
| XXI | Polyethylene glycol MW 1000 | 100 | 33–35 | 88–92 | 110–115 |
| XXII | Polyethylene glycol MW 600 | 100 | liquid | 31–33 | 104–105 |
| XXIII | Polyethylene glycol MW 400 | 100 | liquid | liquid | 87–90 |
| XXIV | Diethylene glycol | 100 | liquid | liquid | 28–30 |

As can be seen from Table II the solid urea complexes become higher melting as the urea content increases. Furthermore the higher the molecular weight of the photopolymer component, the less urea is required to form a solid.

EXAMPLE XXV

The polyene and polythiol containing the photocuring rate accelerator and stabilizers as set out in Example VIII were admixed with varying weight percents of particulate urea (below 10 microns) at a temperature of about 50°–60° C and allowed to cool overnight under ambient conditions until solidification took place. The hardness of the resultant solidified urea-containing polyene/polythiol compositions after solidification are set out in Table III.

TABLE III

| Weight % Urea in Polyene/ Polythiol Composition | Hardness | |
|---|---|---|
| | Shore A | Shore D |
| 20 | 48 | 10 |
| 33 | 74 | 34 |

TABLE III-continued

| Weight % Urea in Polyene/ Polythiol Composition | Hardness | |
|---|---|---|
| | Shore A | Shore D |
| 50 | 81 | 39 |

As can be seen from Table III the urea-containing polyene/polythiol compositions become harder as the urea content increases.

EXAMPLE XXVI

The polyene/polythiol composition including the curing rate accelerator and photosensitizers of Example VIII were measured for various mechanical properties as 20 mil thick sheets with and without particulate urea (below 10 microns) prior to and subsequent to curing in accord with the procedure set out in Example VIII. The results are shown in Table IV.

TABLE IV

| Composition | Modulus (p.s.i.) | Tensile (p.s.i.) | Elongation at Failure % | Hardness Shore A |
|---|---|---|---|---|
| 100% Polyene/ Polythiol uncured | | | liquid | |
| 100% Polyene/ Polythiol cured | 475 | 121 | 42 | 55 |
| Polyene/Polythiol: urea; 67:33 uncured | 48,000 | 172 | 1 | 85 |
| Polyene/Polythiol: urea; 67:33 cured | 58,000 | 731 | 9 | 82 |

It can be seen from Table IV that the urea addition to the polyene/polythiol photocomposition affords a dramatic increase in modulus and tensile of the cured formulation.

EXAMPLE XXVII

To a 4 ounce glass jar was charged 43.9 grams of Polyene A from Example II, and as stabilizers 0.41 grams of 2,6-ditertiary-butyl-4-methylphenol, 0.41 grams of octadecyl β-(4-hydroxy-3,5-di-t-butylphenyl)propionate and 0.05 grams of phosphorous acid. 38.8 grams of commercially available polyethylene glycol di(3-mercaptopropionate) having a molecular weight of 776 was added to the glass jar and the mixture was stirred until homogeneous. At ambient temperature (24°C) this mixture was a liquid.

20 grams of the mixture was heated at about 50°–60°C, and 10 grams of urea which had been ground in a fluid energy mill with air until the particle size was below 10 microns was added to the mixture with vigorous mechanical stirring. A smooth paste resulted, which became a hard solid upon cooling at ambient temperature (24° C) overnight. This urea-containing polyene/polythiol composition melted at 88°C. The composition was melted and spread to about 20 mil thickness and cooled to solidify. The composition was exposed to an electron radiation dose of 2 megarads from a 2.0 Mev Van de Graaff generator. The irradiated product consisted of a crosslinked structure as demonstrated by its insolubility extraction with refluxing methanol.

On exposure to radiation the solid crystalline complexes of urea and the ethylene oxide-containing polyene/polythiol form a cured urea complexed polythioether.

What is claimed is:

1. A solid radiation curable composition capable of forming, upon curing, a crosslinked, three dimensional network comprising (1) a particulate urea having a mesh size of no greater than 10 microns in an amount ranging from 10–70 weight percent of the composition, and a liquid mixture of (2) a polyene containing at least two unsaturated carbon to carbon bonds per molecule and (3) a polythiol containing at least two thiol groups per molecule, the total combined functionality of the unsaturated carbon to carbon bonds per molecule in the polyene and the thiol groups per molecule in the polythiol being greater than 4, and the combined polyene and polythiol containing at least 20 percent by weight of oxyethylene units.

2. The composition according to claim 1 wherein 0.0005 –50 parts by weight of the polyene and polythiol of a photocuring rate accelerator is added to the composition.

3. A cured urea complexed polythioether.

4. The process of forming a cured crosslinked, three-dimensional network urea complexed polythioether which comprises admixing (1) a particulate urea having a mesh size of no greater than 10 microns in an amount ranging from 10–70 weight percent of the composition, and a liquid mixture of (2) a polyene containing at least two unsaturated carbon to carbon bonds per molecule and (3) a polythiol containing at least two thiol groups per molecule, the total combined functionality of the unsaturated carbon to carbon bonds per molecule in the polyene and the thiol groups per molecule in the polythiol being greater than 4, and the combined polyene and polythiol containing at least 20 percent by weight of oxyethylene units to form a solid and thereafter exposing said solidified admixture to high energy ionizing radiation at a dosage of 0.02–5 megarads.

5. The process of forming a cured crosslinked, three-dimensional network urea complexed polythioether which comprises admixing (1) a particulate urea having a mesh size of no greater than 10 microns in an amount ranging from 10–70 weight percent of the composition, and a liquid mixture of (2) a polyene containing at least two unsaturated carbon to carbon bonds per molecule (3) a polythiol containing at least two thiol groups per molecule, the total combined functionality of the unsaturated carbon to carbon bonds per molecule in the polyene and the thiol groups per molecule in the polythiol being greater than 4, and the combined polyene and polythiol containing at least 20 percent by weight of oxyethylene units and (4) a photocuring rate accelerator to form a solid and thereafter exposing the solidified admixture to U. V. radiation at an intensity of 0.0004–60.0 watts/cm$^2$.

6. An article comprising the composition of claim 1 as a coating on a substrate.

7. An article comprising the composition of claim 2 as a coating on a substrate.

8. A shape molded article cast from the composition of claim 1.

9. A shape molded article cast from the composition of claim 2.

* * * * *